(12) United States Patent
Lee

(10) Patent No.: US 6,388,604 B1
(45) Date of Patent: May 14, 2002

(54) CIRCUIT FOR LPI SIGNAL DETECTION AND SUPPRESSION OF CONVENTIONAL PULSED SIGNALS

(75) Inventor: Jim P. Y. Lee, Nepean (CA)

(73) Assignee: Her Majesty the Queen in right of Canada, as represented by the Minister of National Defence, Ottawa (CA)

(*) Notice: Subject to any disclaimer, the term of this patent is extended or adjusted under 35 U.S.C. 154(b) by 0 days.

(21) Appl. No.: 09/597,481

(22) Filed: Jun. 19, 2000

(30) Foreign Application Priority Data

Jul. 27, 1999 (CA) .............................................. 2279161

(51) Int. Cl.$^7$ ................................................ G01S 7/36
(52) U.S. Cl. .......................... 342/13; 342/147; 342/162; 342/192; 342/194; 342/195; 342/417; 342/444; 342/445
(58) Field of Search .............................. 342/13, 14, 15, 342/16, 17, 18, 19, 20, 21, 147, 162, 173, 192, 194, 196, 417, 444, 445; 455/227

(56) References Cited

U.S. PATENT DOCUMENTS

| 4,127,819 A | * | 11/1978 | Keane | 455/192.1 |
|---|---|---|---|---|
| 4,263,554 A | * | 4/1981 | Keane | 327/47 |
| 4,563,638 A | * | 1/1986 | Dunn | 324/76.29 |
| 4,612,545 A | * | 9/1986 | Asendorf et al. | 342/16 |
| 4,965,581 A | | 10/1990 | Skudera, Jr. et al. | 342/19 |
| 5,381,150 A | | 1/1995 | Hawkins et al. | 342/13 |
| 5,646,623 A | * | 7/1997 | Walters et al. | 342/129 |
| 5,955,993 A | * | 9/1999 | Houghton et al. | 342/417 |

* cited by examiner

Primary Examiner—John B. Sotomayor
(74) Attorney, Agent, or Firm—Larson & Taylor, PLC

(57) ABSTRACT

A pulse Low Probability of Intercept (LPI) signal discriminator has a soft-limiting IF amplifier chain for receiving an IF signal to soft-limit any high-peak IF signals in the IF signal and a high-peak amplitude compressive circuit followed by an integrator which integrates the signal over a predetermined time to produce a high output when a LPI signal is present. The integrator is connected to a threshold detector which outputs a trigger signal when a high output from the integrator is received. In a receiver having a plurality of channels for received signals from a number of antenna, one channel for each antenna, the received signals are down converted to IF signals and applied to analog-to-digital converters (ADCs) which are connected to a digital processor. A pulse/LPI signal discriminator is connected to a channel to receive an IF signal from an associated down converter and produce a trigger pulse when a LPI signal is present which will gate signals from buffer memories connected to ADCs to the digital processor if an LPI signal is detected.

7 Claims, 7 Drawing Sheets

CIRCUIT FOR LPI SIGNAL DETECTION AND SUPPRESSION OF CONVENTIONAL PULSED SIGNALS

This invention relates to a digital system that is used to detect low peak power Low Probability of Intercept (LPI) signals and to suppress strong conventional pulsed signals, and more particularly, to such a system which utilizes an LPI Discriminator.

BACKGROUND OF THE INVENTION

Various reconnaissance systems are used to intercept radar signals and decipher some of their critical characteristics and angles of arrival. A microwave intercept receiver may be used for just this purpose. In particular reconnaissance applications in areas such as Electronic Warfare (EW) the receiver is designed to fulfill roles such as radar warning, electronic support measures (ESM), and Electronic Intelligence (ELINT). In most conventional approaches, the intercept receiver is designed to perform two functions The first function is to measure the signal characteristics of the intercepted signal, and the second is to determine its angle of arrival (AOA) for the purpose of direction finding (DF) and location of the radar source.

With the proliferation of radar systems and the increasing number of radars employing complex waveform modulation, it is difficult to differentiate and sort the intercepted radar signals using just the coarse conventional parameters. Typically these coarse parameters include AOA, carrier frequency, pulse width (PW), pulse repetition interval (PRI), and scan pattern. Since many radars have similar conventional parameters, ambiguity may occur in both the sorting and identification processes.

One type of receiver that may be used to precisely measure the conventional parameters as well as the intrapulse modulation for both sorting and identification purposes is the intrapulse receiver.

However, the use of Low Probability of Intercept (LPI) radars with low peak power has introduced a further requirement for modem intercept receivers, requiring them to have a much higher sensitivity in order to detect these LPI radar signals. Until recently, almost all radars were designed to transmit short duration pulses with a high peak power. This type of signal is easy to detect using relatively simple, traditional EW intercept receivers making the attacker (radar source) vulnerable to either antiradiation missiles or Electronic Counter Measures (ECM). However, by using LPI techniques it is possible to design a LPI radar that is effective against traditional EW intercept receivers. One of the most important LPI techniques is the use of phase or frequency waveform coding to provide transmitting duty cycles approaching one. This technique can result in drastic reductions in peak transmitted power while maintaining the required average power.

Therefore with an increasing number of radars employing complex waveform modulation in addition to using low-peak power LPI signals, it is required that a modern intercept receiver perform the following three basic functions: a) measure and characterize conventional pulsed radar signals; b) detect and characterize LPI signals; and c) determine the AOA for both conventional pulsed signals and LPI signals. Furthermore, these three functions should be performed on the intercepted signals in a multiple signal environment and on a pulse-by pulse basis.

A current architecture that accomplishes both signal measurement and accurate AOA determination on conventional pulsed signals is an interferometer. In an interferometer, a number of antenna elements are distributed in a two-dimensional plane and phase comparison between different antenna elements is used to determine the AOA. Microwave phase detectors are typically used for phase comparison. Recently these phase detectors have been replaced by digital measurement techniques. The signal characteristics of the intercepted signals are measured either from the output of one of the interferometer antennas or from a separate antenna. Signal characterization is performed using an intrapulse receiver implemented by analog devices. In this case, a frequency discriminator is used for frequency measurement while a Detector Log Video Amplifier (DLVA) is used for amplitude measurement.

Detection of LPI signals is currently accomplished using a channelized receiver instead of an intrapulse receiver. A channelized receiver is typically implemented using either a band of microwave filters with a detector at the output of each filter. Other receivers may be used, such as a time-integrating acousto-optic spectrum analyzer and compressive receiver. The use of a channelizer will reduce the noise bandwidth in each channel and thus increase the receiver sensitivity for LPI signal detection. Other architectures such as correlators are also suitable for LPI signal detection and AOA determination. These correlators are implemented using analog, optical, or digital technology. However, the AOA determination process is quite different from the interferometer approach and very limited intrapulse information can be extracted.

As mentioned above, digital signal processing technology is used in both the single-channel and the multi-channel receiver architectures. The potential advantages of digital receivers are robustness, flexibility and cost. However, the processing functions can be quite complex and numerous once the IF signals digitized. This is especially true in the case of the multi-channel digital receiver architecture. It is still quite a challenge for the digital signal processing technology to meet all of the processing requirements if all of the digitized data from the Analog-to-Digital Converters (ADCs) are to be processed in or near real-time.

It is to be noted that the vast majority of radar signals are of pulsed nature and the duty cycles are relative low. Therefore, the portion of the digitized data set where the signals are actually present could be quite small in a typical signal environment. Most conventional radars transmit high-peak power and pulses with pulse width less than 1 $\mu$s. However, LPI signals are generally characterized by very low-peak power and are of much longer duration. Pulse widths of LPI signals are expected to be 5 $\mu$s and longer. Digitized IF signals of an LPI signal and a pulsed signal are shown in FIG. 1. If a threshold is used on the digitized data to reduce the amount of data to be passed on to the processor, the LPI signal will likely be missed and undetected.

It is an object of the present invention to obviate or mitigate the above disadvantages.

SUMMARY OF THE INVENTION

The present invention seeks to provide a solution to the problem of radar processor overload when LPI signals are present with conventional pulsed signals.

An advantage of the present invention is to enhance the detection of weak LPI signals.

A further advantage of the present invention is to suppress the presence of high-peak power and short-duration conventional pulsed signals, and to trigger a data buffer for gating digitized LPI data to a processor for processing.

In accordance with this invention there is provided an LPI signal discriminator comprising an amplifier for receiving an incoming IF signal; a signal detector; and a comparator responsive to the output of the signal detector for producing a trigger signal when the detected signal is above a predetermined threshold.

A still further embodiment of the invention provides for a digital receiver for determining parameters of an incoming signal, comprising: one or more receiver channels, each channel including a respective antenna for receiving the incoming signal; a down converter for converting the signal to an intermediate frequency (IF) signal; an analog-to-digital converter (ADC) operatively coupled to receive the IF signal and to provide a digital signal output in response to a trigger signal, the digital signal being indicative of the phase and amplitude of the received signal in the channel; a digital processor operatively coupled to receiving the digital signals from each of the plurality of channels and for determining the parameters by utilizing the phase and amplitude on a pulse by pulse basis; and an LPI signal discriminator operatively coupled to the down converter for producing the trigger signal when the incoming signal is above a predetermined threshold, to thereby transfer the digitized signal to the signal processor for processing the incoming LPI signal.

BRIEF DESCRIPTION OF THE DRAWINGS

An embodiment of the invention will now be described by way of example only, with reference to the accompanying drawings in which.

DETAILED DESCRIPTION OF THE PREFERRED EMBODIMENT

Figure 1:
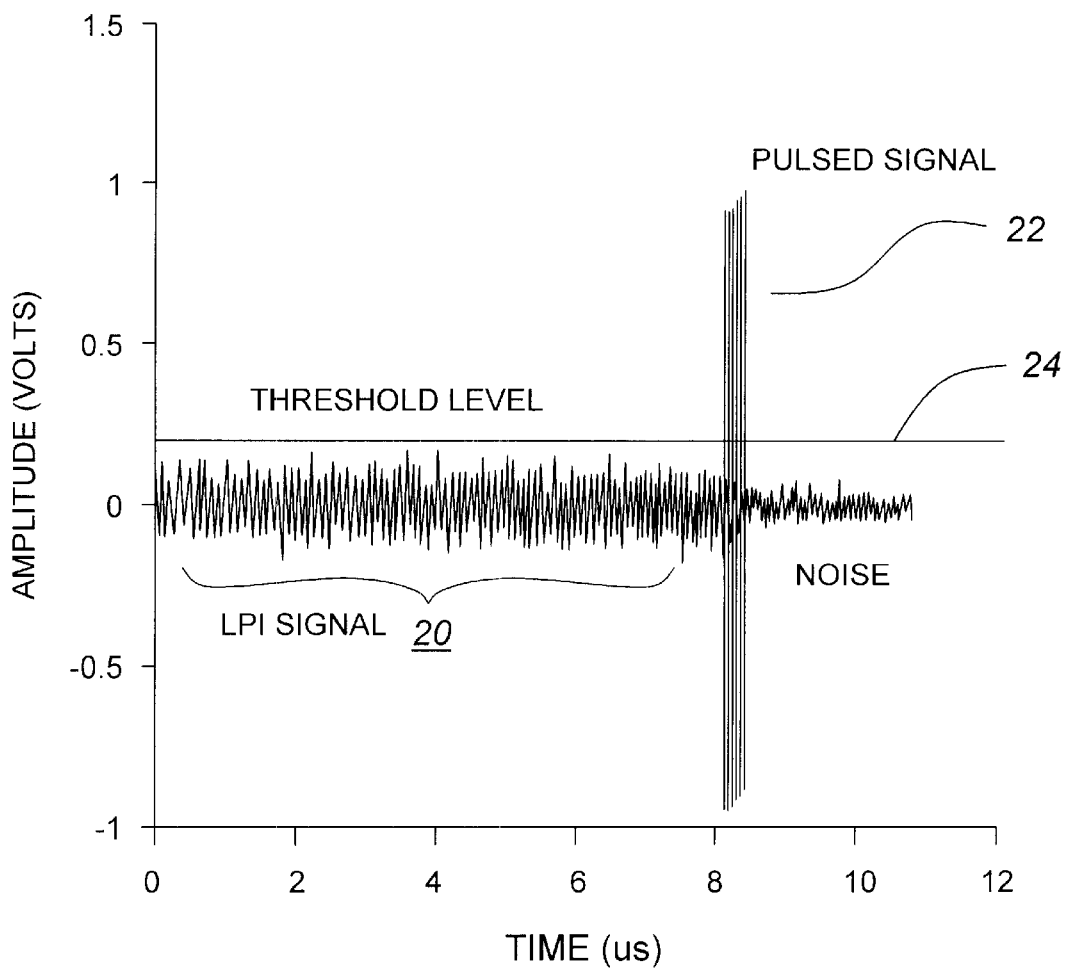
FIG. 1 is a plot of an LPI and Pulsed signals.

For convenience in the following description, like numerals refer to like structures in the drawings.

Figure 2:
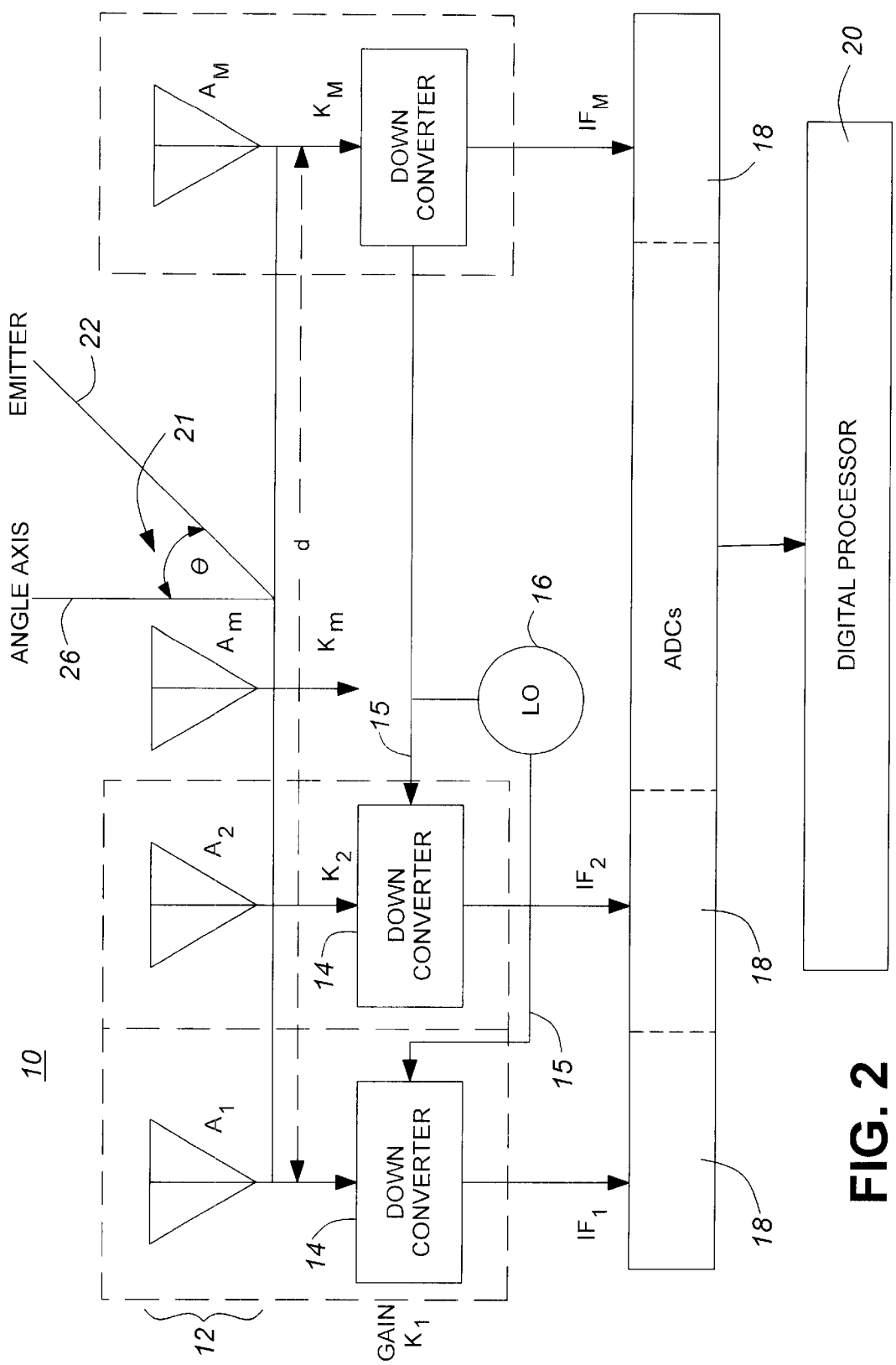
FIG. 2 is a block diagram representing the overall architecture of a multi-channel digital receiver.

Referring to FIG. 2, a multi-channel digital receiver as described in the applicants co-pending application is shown by numeral 10. The receiver consists of M channels, each channel is comprised of an antenna 12 for receiving an incoming radar signal 22; one of M down converters 14, a local oscillator (LO) 16 signal 15, and an analog-to-digital converter 18. The receiver further includes a digital processor 20 for processing the digitized data from each of the M channels and for controlling the ADC's 18. Each antenna $A_i$ in the array corresponds to a channel i of the receiver and is comprised of a respective down converter $MIX_i$, which is driven by the local oscillator signal 15 to convert and amplify by $K_i$ the intercepted signal 22 from its respective antenna $A_i$, to an intermediate frequency $IF_i$. Each $IF_i$ is fed to a respective ADC 18, which converts the IF signal to a digital signal which is in turn applied to the digital processor 20 for determining the relevant parameters from all the channels.

Figure 3:
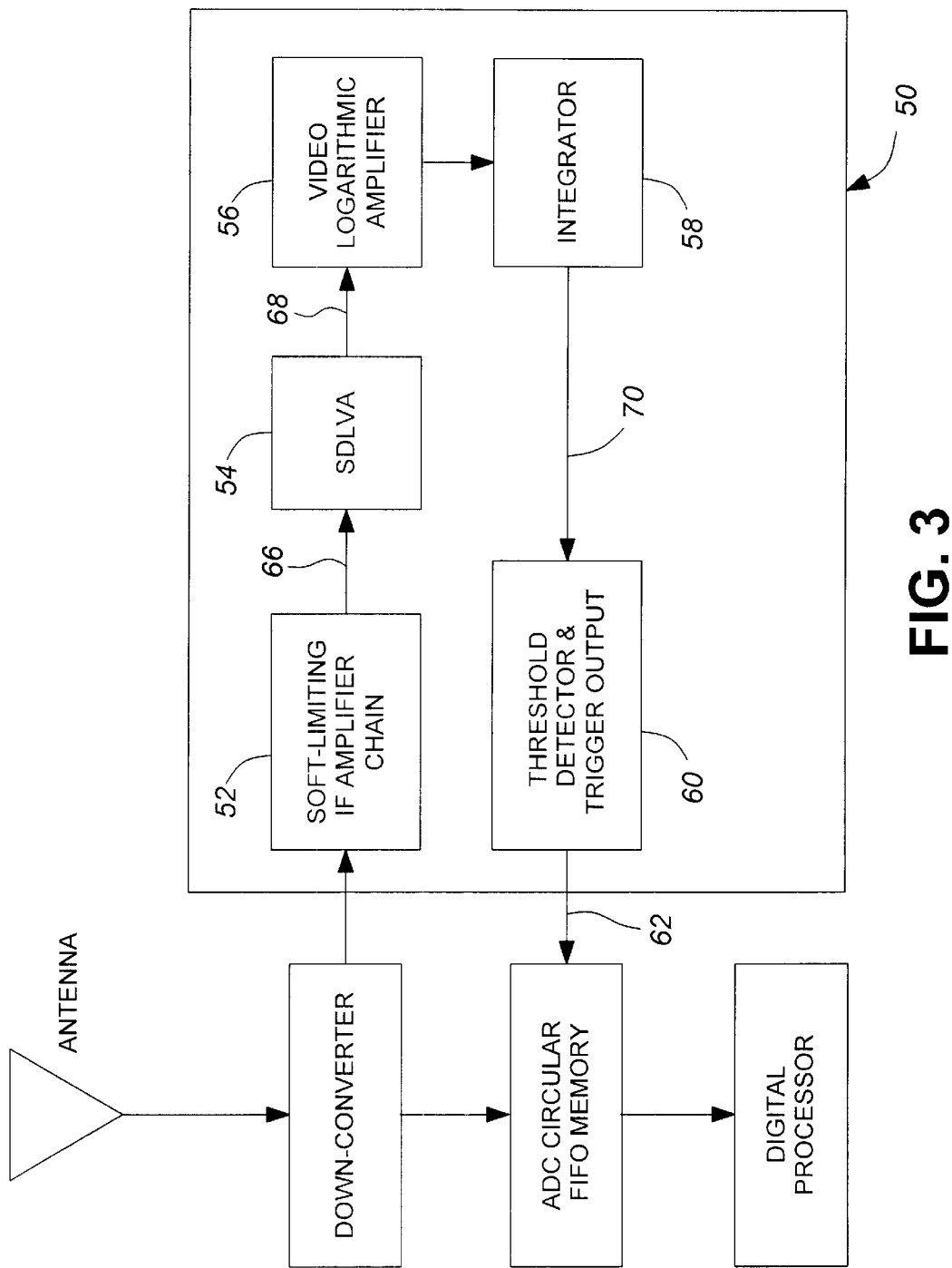
FIG. 3 is a Block Diagram of a LPI/Pulsed signal detector and discriminator.

Although only one channel is shown in FIG. 3, each of the receiver channels has the same capabilities. The receiver is capable of intercepting both conventional and LPI signals. However, the digital processor is not capable of analysing all of the signals in real time in a typical signal environment. In order to effectively analyse an LPI signal, it is necessary to ignore the conventional signals and focus only on the LPI signals. Therefore an additional circuit is needed to provide an indication that an LPI signal is present in the digitized data, and to transfer the digitized data to the processor for processing as soon as an LPI signal is detected.

Referring to FIG. 3 a LPI detector circuit according to an embodiment of the present invention is shown generally by numeral 50. The circuit 50 includes two or more IF amplifiers 52 cascaded with pads between the amplifiers. This arrangement is used to distribute the signal power evenly throughout the chain and to soft limit strong received pulsed signals. The IF amplified signal is detected by a large dynamic range successive detector log video amplifier (SDLVA) 54. A video logarithmic amplifier 56 further compresses the logarithmic video output level before it is time-integrated by at least one integrator 58. A threshold comparator 60 receives the output from the integrator 58 to provide a trigger pulse output 62 when the input crosses a predetermined threshold value set by the processor.

As shown in FIG. 1, an LPI signal 20 is typically characterized by low peak power and a long pulse width. Also, its waveform is usually frequency or phase modulated. Since an LPI signal has a low peak power, it will remain relatively unaffected by the limiting and compression inherent in the circuit and the time-integrated output level will be quite high. However, a conventional pulsed signal 22 has a high peak-power, low duty cycle, and a short pulse width. The high peak power will likely be limited by the amplifiers 52 in the LPI/Pulsed signal detector and discriminator of FIG. 3 and compressed by both the SDLVA 54 and the video logarithmic amplifier 56. The compressed amplitude and naturally short pulse width will result in an output from the integrator that is significantly lower than that from an LPI signal. Therefore, it is possible to set the threshold in the circuit to an appropriate level such that the compressed, time-integrated conventional signals can be kept below that level and thus rejected.

Practically, more than one integrator 58 may be necessary. The integrator is active for a specific time period and then it resets for another, generally much shorter, time period. Pulses from an intercepted pulse train are unlikely to be separated by multiples of the integration period. Therefore, short pulses have a chance of falling within the reset time interval and being missed altogether by the integrator 58. Conversely, a longer pulse, such as an LPI signal, may be integrated between two integration periods resulting in a loss of sensitivity. The sensitivity loss can be somewhat recovered by having two integrators running in parallel, with a time offset equal to half the integration period and the maximum of the two outputs is selected.

In another embodiment, it is possible to operate the circuit without the video logarithmic amplifier 56. Although this embodiment may still be effective, it is not as effective as the previous preferred embodiment. The following example will demonstrate how the circuit works for one particular set of component values. It will also show the differences resulting from implementing the circuit with and without the video logarithmic amplifier.

In this particular example, it is assumed the total receiver noise figure is about 4 dB and the total noise equivalent bandwidth is about 200 MHz. Two IF amplifiers with a gain of 20 dB each are used. The 1 dB power compression point of the first amplifier and the second amplifier are 7 dBm and 12 dBm respectively. A 6-dB pad is inserted between the two amplifiers and a 16-dB pad is inserted between the second amplifier and the SDLVA. The combined 1 dB power compression point at the input of the SDLVA is about −4 dBm. The amplitude transfer function of the SDLVA is 15 mV/dB and an output of 0 Volts is indicated when an input power level of −65 dBm is applied.

Figure 4:
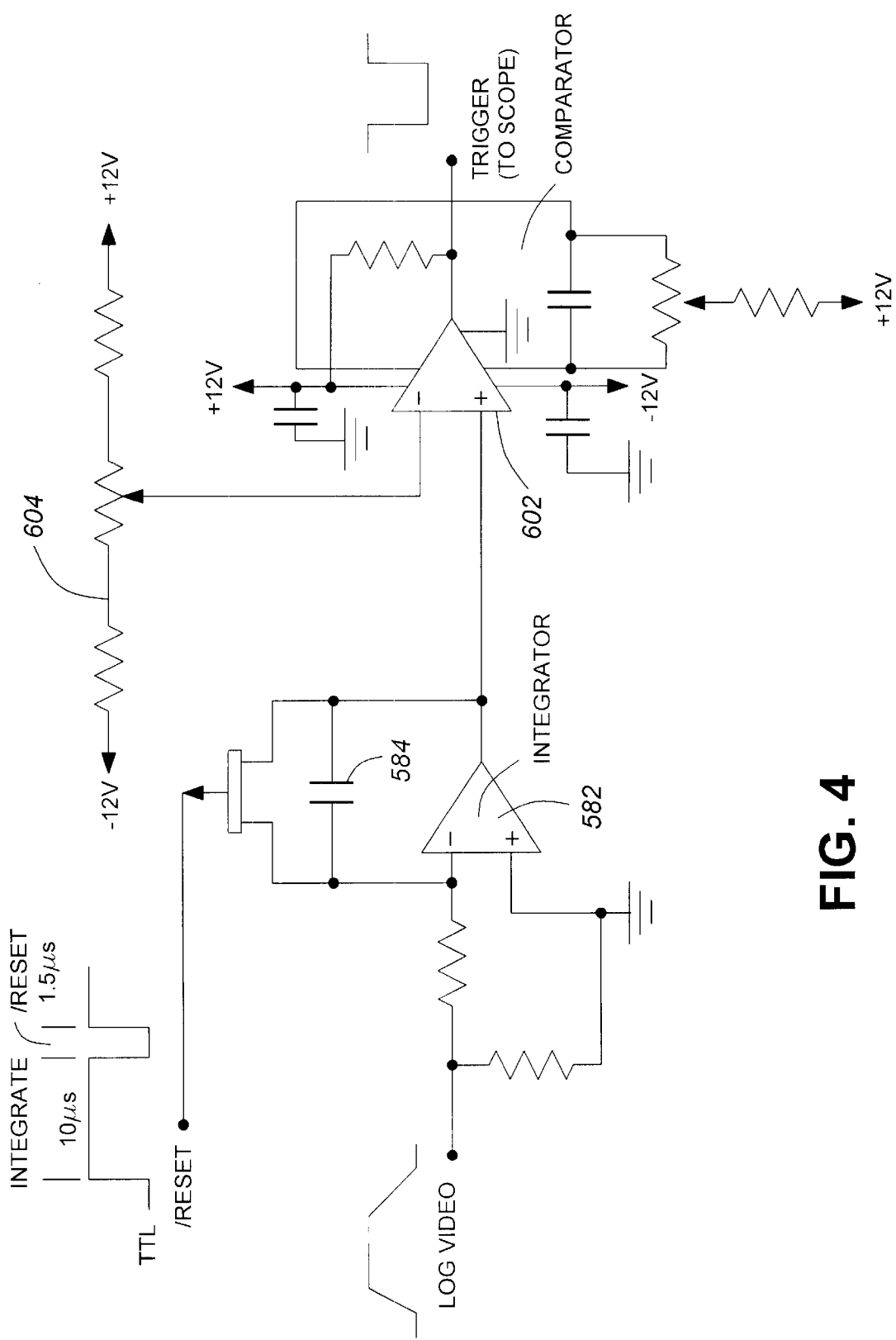
FIG. 4 is a circuit diagram of the integrator, threshold detector, and trigger output circuit.

Referring to FIG. 4, the integrator 58, threshold control and trigger output circuit 60 are shown in detail. The integrator is comprised of an op-amp 582 with a capacitor 584 in its feedback path. The output from the integrator is applied to one input of a comparator 602, the second input of the comparator determines the threshold level which is set by a resistive divider network 604. The output of the comparator 602 is then used to gate the ADC circular FIFO memory in a receiver circuit, as shown in FIG. 2.

Figure 5:
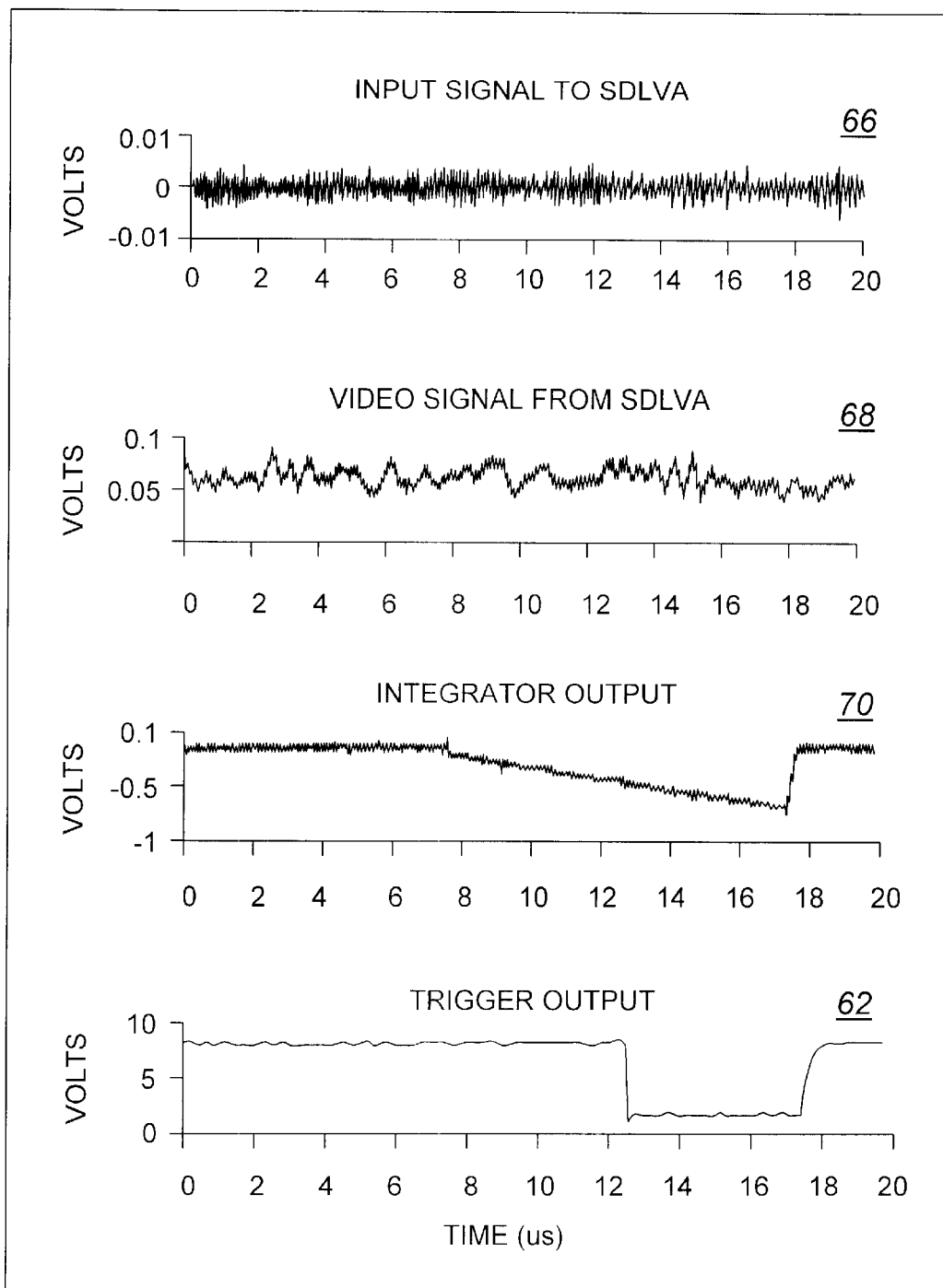
FIG. 5 shows digitized data of LPI and Pulsed signals at various point in the circuit of FIG. 3.

The integrator is set to integrate for approximately 10 $\mu$s and then reset. The reset time is approximately 1.5 $\mu$s in duration. Pulsed modulated signals with biphase coding and frequency modulation are used. It is found that the modulation has very little effect on the response of the circuit when the frequency spectrum of the signal is well within the bandwidth of the circuit. Hence, pulsed modulated continuous wave signals of different pulse width are used in the characterization of the circuit. Typical waveforms showing the presence of an LPI signal at various points in the circuit 50 are shown in FIG. 5.

Figure 6:
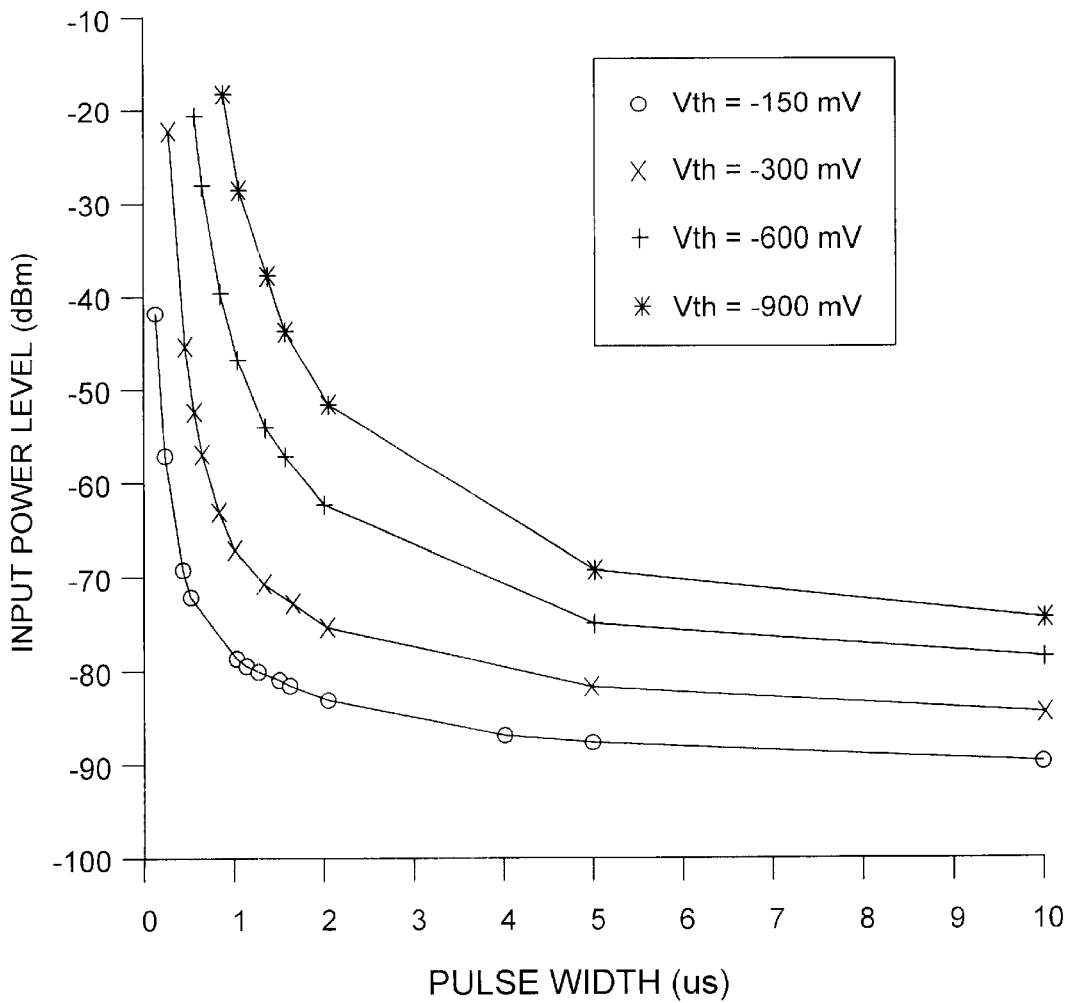
FIG. 6 is a graph of an input signal capture level versus pulse width for different threshold levels.

For testing purposes, the pulse repetition interval is chosen in such a manner that the pulses fall outside the reset time period. The input signal levels for a probability of signal capture greater than 99.9% and with a probability of false alarm less than 0.1% are plotted in FIG. 6. It is plotted as a function of the pulse width and is displayed for four different threshold levels. As it can be seen from the graph, a 10 $\mu$s or longer LPI signal with a minimum input power level of −90 dBm will generate a trigger pulse at the output of the circuit when the threshold level for the comparator is set a −150 mV. However, the input power level of a 0.2 ps pulse will have to be at least −57 dBm in order to produce the same trigger pulse. Therefore, an effective signal compression ratio of 33 dB is achieved for this case.

It is possible to observe that the signal compression ratio is greatly reduced as the pulse duration is increased to about 1 $\mu$s. It is also possible to observe that higher compression ratios are achieved when the threshold is set at higher levels. However, the higher threshold level causes a drop in the detection sensitivity of the circuit.

Figure 7:
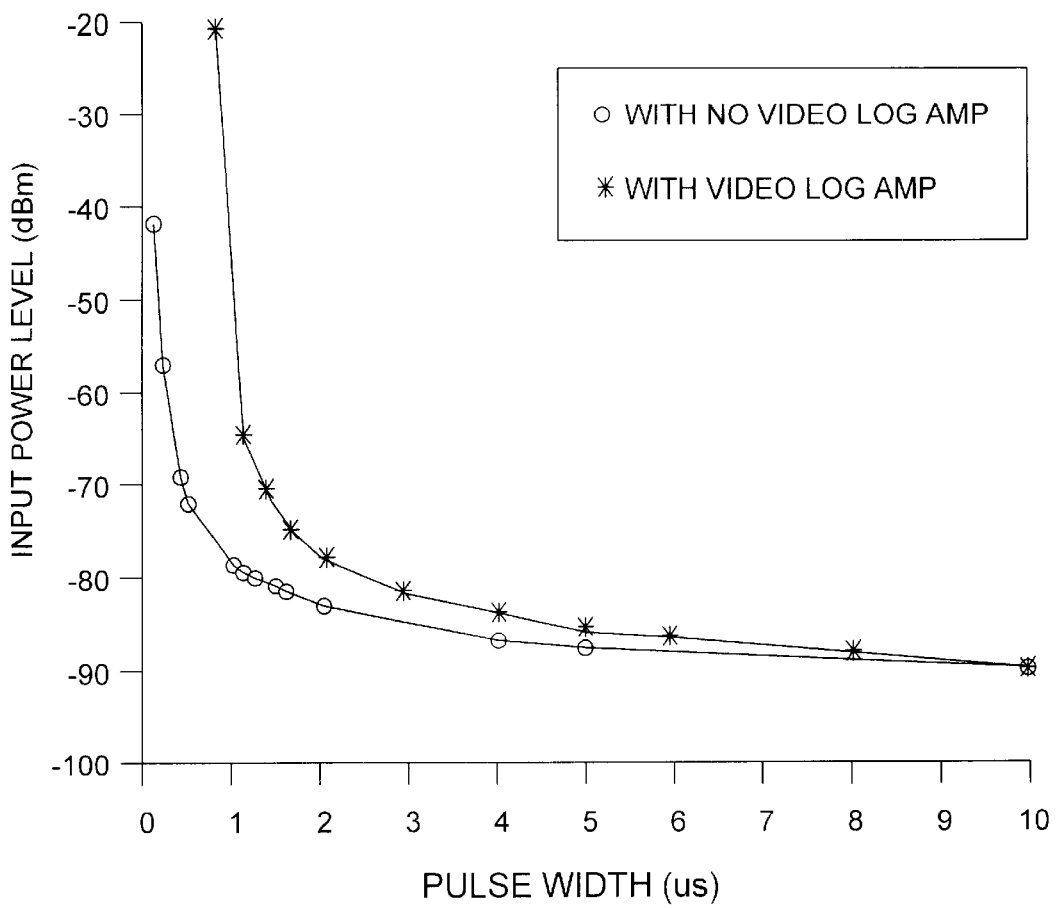
FIG. 7 is a further graph showing the input capture level verses pulse width.

If a video logarithmic amplifier is added to the circuit as per the preferred embodiment, the compression ratio will increase. The capture power level as a function of pulse width with and without the video logarithmic amplifier is depicted in FIG. 7. Both functions are obtained from a circuit with a threshold level set at −150 mV. With this addition, any signal with a pulse width of less than 1 $\mu$s is completely undetected by the circuit and will not produce a trigger output. There is also, however, a slight drop in the receiver sensitivity for signals of longer pulse widths.

The tangential sensitivity (TSS) of the circuit which includes the down converter of the receiver is approximately given by:

$$TSS=-114+10\log(NF)+10\log[6.31B_v+2.5\sqrt{(2B_rB_v-B_v^2)}]dBm \quad (1)$$

where $B_v \approx 1/(2T)$, T is the integration period, $B_r$ is the IF bandwidth and NF is the noise figure of the receiver.

By substituting the constants for T=10 $\mu$s, Br=200 MHz and NF=4 dB into equation (1) then the tangential sensitivity of the circuit is about −100.5 dBm. In practice, a much higher output SNR than TSS is required in order to have a higher probability of detection and a low false alarm rate. In addition, the total noise figure for the receiver will be higher than 4 dB when other components such as limiters and filters are used before the down-converter.

Referring again to FIG. 6, the measured detection sensitivity with a probability of signal detection of greater than 99% is shown to be at −90 dBm for a signal which has a duration greater than 10 $\mu$s and when the threshold level is set to −150 mV. If higher receiver sensitivity is required for the detection of LPI signals, it can be achieved by using (i) a lower output SNR and thus a lower threshold level for the comparator, (ii) a narrower IF bandwidth, and (iii) an antenna with a higher gain to provide additional system sensitivity.

The compression ratio, in general, can be varied by adjusting the comparator threshold level, the video amplifier gain slope, the integration period, or a combination thereof. The digitized data to be gated to the processor by the circuit must be delayed by an amount greater than the integration period. This delay is achieved by using a circular FIFO memory as a buffer.

The circuit described in the aforementioned embodiments accomplishes the following functions: enhancing the detection of weak LPI signals; suppressing the presence of high peak-power and short duration conventional pulsed signals and sending a trigger output signal to the digitized data buffer for gating the digitized data, which contains only the LPI signal, for further processing.

The addition of this circuit to a single channel digital receiver, and in particularly, a multi-channel digital receiver will reduce the amount of data to be processed, thereby improving the performance of the processor for real-time and near real-time operation. In addition, the circuit is quite versatile in that the compression ratio can be varied in a number of different ways.

Although the invention has been described with reference to certain specific embodiments, various modifications thereof will be apparent to those skilled in the art without departing from the spirit and scope of the invention as outlined in the claims appended hereto.

What is claimed is:

1. A pulse/LPI signal discriminator comprising:
   (a) a series circuit connected to an input of a threshold detector that produces a trigger signal when an input to the detector is above a predetermined threshold;
   (b) an input to the series circuit being connected to an input of an IF amplifier that soft-limits any high-peak short-pulse IF signals in a received IF signal;
   (c) a successive detector logarithmic video amplifier (SDLVA) in the series circuit being connected to an output of the IF amplifier;
   (d) an output from an integrator located after the amplifiers in the series circuit being connected to an input of the threshold detector, the integrator integrating signals in the series circuit over a predetermined period of time and producing a high output signal when a LPI signal is present in the IF signal; and
   (e) a high output from the integrator to the threshold detector resulting in said trigger signal being created.

2. A pulse/LPI signal discriminator as defined in claim 1 wherein the IF amplifier comprises at least two IF amplifiers cascaded with pads between the IF amplifiers.

3. A pulse/LPI signal discriminator as defined in claim 2 wherein a video logarithmic amplifier is connected between an output of the SDLVA and an input to the integrator.

4. A pulse/LPI signal discriminator as defined in claim 3 wherein the period of time is about 10 $\mu$s after which the integrator is reset.

5. A pulse/LPI signal discriminator comprising:
   (a) a series circuit connected to a threshold detector that produces a trigger signal when an input to the detector is above a predetermined threshold;
   (b) an input to the series circuit being connected to an input of an IF amplifier that soft-limits any high-peak short-pulse IF signals in a received IF signal;
   (c) the IF amplifier being connected to circuitry that further compresses the amplitude of high-peak signals, said circuitry having an output connected to an integrator; and
   (d) the integrator integrating a received signal over a predetermined period of time and producing a high output signal when a LPI signal is present in the received IF signal, an output from the integrator being connected to the threshold detector whereby a high output from the integrator produces said trigger signal from the threshold detector.

6. A pulse/LPI signal discriminator as defined in claim 5 wherein the IF amplifier comprises at least two IF amplifiers cascaded with pads between the amplifiers.

7. A receiver for determining parameters of an incoming signal, comprising:
   (a) a plurality of receiver channels, each channel including a respective antenna for receiving said incoming signal;
   (b) a down converter associated with each of said plurality of receiver channels for converting said incoming signal to an intermediate frequency signal;
   (c) an analog-to-digital converter with a circular FIFO memory as a buffer operatively coupled to receive said IF signal and to provide a digital signal in response to a trigger signal, said digital signal being indicative of the phase and amplitude of said incoming signal in said channel;
   (d) a digital processor operatively coupled to receive said digital signal from each of said plurality of channels and for determining parameters of the digital signal; and
   (e) a pulse/LPI signal discriminator operatively coupled to one of said down converters for producing a trigger signal when a signal in the discriminator is above a predetermined threshold, said trigger signal being applied to the memory to thereby gate digitized data in the memory to a digital processor for processing.

* * * * *